United States Patent Office 2,860,060
Patented Nov. 11, 1958

2,860,060

HYDRAULIC CEMENT ADDITIVES AND CEMENT COMPOSITIONS CONTAINING SAME

Stephen W. Benedict, Cleveland Heights, Thomas M. Kelly, Chagrin Falls, and Paul B. Jacox, Newburgh Heights, Ohio, assignors to American-Marietta Company, Chicago, Ill., a corporation of Illinois No Drawing. Application March 6, 1956
Serial No. 569,678

16 Claims. (Cl. 106—90)

This invention relates to additive compositions for incorporation in hydraulic cement mixes, for example, Portland cement concretes and mortars and dry mixes for making such concretes and mortars, and to the resultant hydraulic cement mixes containing the additive compositions.

Various so-called "plasticizing agents" or "water-reducers," such as waste sulfite liquors or the solids contained therein, have been used to increase the workability and placeability of cement mixes. Also, these agents increase the final compressive strength of concretes and mortars, or permit reductions in the amount of cement employed while maintaining a given compressive strength.

One of the drawbacks in the use of water-reducers such as waste sulfite liquors and their derivatives has been the retarding effect on the rate of setting and hardening of a cement mix, especially at low temperatures. Such retarding effect may be partially corrected by the use of substantial amounts of an accelerator such as calcium chloride. However, when a sufficient quantity of an accelerator is used to overcome early retardation, the rate of hardening while the mass is in condition for finishing is apt to be so rapid that there is insufficient time to properly complete the finishing operations.

In cases where no increase in compressive strength is required, and a water-reducer is used to permit a reduction in the amount of cement and to give flowability, a serious problem has been the lack of cohesion between the cement-sand mortar and the large aggregate of lean, high slump mixes, resulting in segregation of the aggregate upon pouring or flowing the concrete when placing it.

The use of air-entraining agents to increase the resistance of hardened concrete to freezing and thawing and to the scaling effects of salts used for de-icing has also been a problem where high strength is desired, because increases in the amount of entrained air result in a reduction in strength. Therefore, it has been customary heretofore to limit the amount of entrained air to a predetermined maximum, such as 5% or less. Recent studies by the Bureau of Public Roads have indicated that air contents up to about 7%, or even 8%, would be desirable from the standpoint of durability if adequate strength could be maintained.

The objects of the present invention, broadly stated, are to provide hydraulic cement additives which have superior properties as water-reducers in permitting the use of lower unit water contents and lower cement factors for given final compressive strength requirements, but which additives have little or no retarding effect; impart a high degree of cohesiveness and flowability without segregation for a given slump, even in very lean mixes having abnormally high unit water contents; and permit increased air-entrainment with less, if any, sacrifice in strength than has heretofore been possible.

More specifically, it is an object of the invention to provide hydraulic cement additives which are more effective than prior additives in maintaining strength with reduced cement factors and in permitting the use of high slump concrete while maintaining cohesion, plasticity, and flowability with a reduced water unit content.

Another specific object of the invention is to provide more effective water reducers which maintain a hardening rate approximating that of a plain cement mix of comparable compressive strength at normal and elevated temperatures, and which accelerate the set at very low temperatures which normally greatly retard the set of plain mixes.

Another specific object of the invention is to provide hydraulic cement additives which impart a higher degree of plasticity and flowability to cement mixes than prior additives, so as to permit a reduction in the ratio of sand to large aggregate and, hence, still greater water reduction and resultant lower cement factors.

Still another object of the invention is to provide hydraulic cement additives which impart a higher degree of cohesiveness to cement mixes so as to prevent segregation of very lean, high-slump mixes in spite of high water contents which normally cause serious segregation while such a mix is flowing long distances into spaces enclosed by forms.

Another specific object of the invention is to provide water-reducers for hydraulic cement mixes which permit the entrainment of amounts of air up to as high as 7%, or even 8%, with relatively little reduction in compressive strength, and which impart equal or even greater strength to mixes containing up to 5% or 6% air than the same mixes would have with normal air contents.

Other objects of the invention are to provide hydraulic cement mixes having all of the improved properties recited above, i. e., lower cement content and unit water content for a mix of a given final compressive strength; a rate of hardening at normal and elevated temperatures approximating that of a plain mix formulated to give the same final strength; an accelerated hardening rate at low temperatures; improved plasticity and flowability; increased cohesiveness, over a wide range of unit water contents and cement factors; and ability to tolerate larger amounts of entrained air without appreciable loss in final compressive strength.

The foregoing objectives may all be accomplished in accordance with the invention by using a new combination of four different additive components, all in relatively small amounts based on the amount of cement, and within certain general ranges of proportions relative to each other. These four components are:

(1) Solids of waste sulfite liquor, with or without separation of a portion or all of the carbohydrates, the principal active ingredient being lignosulfonic acid or a salt thereof.

(2) A water-soluble aromatic carboxylic acid, or water-soluble salt or ester thereof;

(3) A chloride accelerator, such as the various water-soluble metal chlorides and ammonium chloride; and (4) A water-soluble, substituted or unsubstituted amine accelerator.

The above four classes of compositions or compounds have all been used before as hydraulic cement additives and have certain recognized individual characteristics in modifying the properties of a cement mix. The third and fourth of these classes comprise compounds known in the art as accelerators, and they are so designated above. However, for most purposes, they are used in accordance with this invention in such small amounts that it is difficult to determine whether or not they actually function as accelerators in the combination described and claimed herein, as explained more fully below.

The waste sulphite liquors of commerce are generally available only in a neutralized form, having been neutralized to convert the acids therein to salts. The usual neutralizers are: calcium, magnesium, ammonium, and sodium, calcium being the most common. The waste sulphite liquor solids referred to herein may be derived from either the neutralized or unneutralized liquor and may consist primarily of only lignosulfonic acid or a salt thereof, or they may include some or all of the various other solids in the liquors. Use of the solids of neutralized liquors is preferred for the purposes of the present invention. However, the same kind of improvement results whether or not the waste sulphite liquor employed has first been neutralized, and whether or not the whole liquor or only the solids are used, though the results will differ in degree of effectiveness.

It is desirable that a substantial portion of the carbohydrates be removed from the waste sulphite liquor or from the solids thereof which are to be used in cement mixes. This may be accomplished by removing the fermentable sugars from the liquor before its use in cement, or before recovering the remaining solids for use in cement, for example, as disclosed in U. S. Patent 2,435,594 to MacPherson, though other purification procedures to remove a portion of the carbohydrates may be employed. Also, for example, the lignosulfonic acid component may be separated from the liquor and used alone as a soluble salt, as disclosed in U. S. Patent 2,141,570 to Mark.

The waste sulphite liquor from which the solids are derived may also be treated with an ion exchange resin, preferably an anion exchanger, although a cation exchanger may be used. This treatment is described in the copending application of Edward W. Scripture, Jr. and Stephen W. Benedict, Serial No. 475,292, filed December 14, 1954. Alternatively, or in addition, the waste sulphite liquor may be treated with activated carbon. This treatment is described in the copending application of Edward W. Scripture, Jr., Stephen W. Benedict, and Paul B. Jacox, Serial No. 543,024, filed October 25, 1955. These treatments also serve to remove certain components or ingredients of the liquors, such as certain of the carbohydrates, which appear to impair the properties of concrete or to detract from the beneficial effects of the lignosulfonic component of the liquors.

In this application, the solids of the untreated liquors or the solids remaining in any of the liquors treated as mentioned above, or the lignosulfonic component separated from any of the liquors, alone or together with other solids contained in the liquors, may be used either in the liquod form or as the dried residue solids thereof. For convenience herein, such solids, with or without being reduced to a dry residue or derivative of the liquors from which they are obtained, are all recognized in the art as water-reducers or plasticizers and are all referred to herein by the term "waste sulfite liquor solids."

The broad class of water-soluble aromatic carboxylic compounds and their water-soluble salts and esters disclosed in U. S. Patent No. 2,264,336 of Edward W. Scripture, Jr. comprises the second component of the combination described and claimed herein. Examples of such compounds which have been found to be effective are: benzoic acid and its water-soluble salts and esters, such as sodium and other alkali and alkaline earth metal benzoates, methyl benzoate, and ethyl benzoate, and the water-soluble hydroxybenzoic acids, alkoxybenzoic acids, etc., and their water-soluble salts and esters, such as salicylic acid, acetyl salicylic acid, acetyl salicylic acid, methyl salicylate, syringic acid, sodium salicylate, calcium salicylate, and magnesium salicylate. Because of the combined considerations of cost, availability and effectiveness, salicylic acid and sodium salicylate are preferred. For convenience herein such compounds comprising the second component of the combination are all referred to as "aromatic carboxylic compounds."

The chloride accelerators comprising the third component of the combination described and claimed herein constitute a well known class of compounds useful as accelerators in hydraulic cement mixes. Included are the alkali and alkaline earth metal chlorides and ammonium chloride. Of these, calcium chloride has been most widely used in the hydraulic cement field and is most suitable for use in accordance with the present invention from the standpoint of availability and cost. For convenience herein, the compounds of this class are all referred to as "chloride accelerators."

The water-soluble amines comprising the fourth component of the combination described and claimed herein are water-soluble, substituted and unsubstituted, non-carboxylic amines and their water-soluble mineral acid addition products and the like which yield the desired amines in aqueous solution. Examples of such amines are the mono-, di-, and triethanolamines; tri-isopropylamine; 2-amino, 1-butanolamine; n-methyl glucamine; mono-, di-, and triethyl amines; 1-amino, 2-methyl, 1-propanolamine; and the like. The primary, secondary, and tertiary alkyl and alkylol amines are particularly suitable, and triethanolamine is preferred from the standpoint of availability and cost. For convenience herein, the amine compounds of this class, including the mineral acid addition products and the like which yield the desired amines in aqueous solution, are all referred to as "water-soluble amines."

In connection with the foregoing definitions, it is to be noted that the four components of the combination, although having only a relatively low solubility in water in some instances, are all used in very small amounts in a cement mix. In referring to such compounds as being water-soluble, therefore, reference is made to solubility of these small quantities in the water of an hydraulic cement mix.

As noted above, various waste sulfite liquor solids have been almost exclusively used in cement mixes heretofore as water-reducers (formerly more commonly referred to as "plasticizers" or as "cement dispersing agents"). These waste sulfite liquor solids have generally been used for this purpose in amounts of about 0.25% to 0.5% or so by weight of the cement. Though such waste sulfite liquor solids constitute the only component of the new combination known to have any significant effect as water reducers, substantially smaller amounts of this component of the combination are used in accordance with the invention than has heretofore been necessary to accomplish the same function of reducing the water and cement required for a mix having a given slump, workability, and final compressive strength.

In combination with calcium chloride as an accelerator, ranging in amounts from around 1% to as high as 2%, or even 3%, by weight of the cement, the retarding effects of waste sulfite liquor solids and derivatives thereof have been reduced, as far as strengths at 1 to 7 days are concerned. However, the objectionable finishing time delays during the day of placement have not been satisfactorily corrected, as explained above.

Mono-, di-, and triethanolamine are also known to function as accelerators and to increase the final strength of the hardened concrete or mortar, when used in hydraulic cement mixes in amounts of about 0.01% or more of the amount of cement. According to U. S. Patent 2,031,621, the addition of such amines to a given plain cement mix of cement, water, and aggregates produces practically no change in consistency, i. e., slump and workability. Beyond this, very little is known about the effect of amines in cement mixes.

Sodium salicylate has also been used as an additive in hydraulic cement mixes to increase the final compressive strength. For this purpose, it has been used in amounts ranging upwardly from about 0.1% or so of the amount of cement, but, in these amounts, it has had no recognized significant effect on the early rate of hardening or rate of gain in strength, or on plasticity, flowability, or cohesiveness, or on the amount of water required in a mix.

The present invention is based upon a surprising discovery that the combination in a cement mix of the four kinds of additives defined above, each in lesser amounts than have heretofore been found to have practical value, produce all of the above-described benefits in hydraulic cement mixes. These results are entirely unpredictable from anything heretofore known about the four components when used individually or in any prior combinations with one or more other ingredients.

The effect of the four-component combination on the rate of hardening of cement mixes is different in kind from any effect of any of the components individually. The maintenance of a close to a normal rate of hardening until a mix has hardened beyond a surface finishing condition, i. e., avoidance of undue acceleration or retardation during the finishing period, is an effect not heretofore obtained by the use of water-reducers, accelerators, or both, and is quite unpredictable. For example, the use of relatively large amounts of ordinary accelerators has the disadvantageous effect, pointed out above, of too greatly accelerating hardening during the finishing period. On the other hand, the quantities of accelerators preferably used in accordance with the invention are so small that they have little or no accelerating effect when used alone. Yet their presence in these amounts in the additives of the invention is essential to obtain the desired rate of hardening and other benefits pointed out herein.

The acceleration of setting at low temperatures, compared to a plain mix, without appreciable acceleration during the finishing period at normal and high temperatures, is contrary to any recognized effect of prior additives for hydraulic cement mixes.

The water and cement reductions permissible with the four-component combination exceed the similar effects of the same quantity of the most effective prior art forms of waste sulfite liquor solids used alone, and none of the other three components has heretofore been known to have any properties which might explain this result.

While waste sulfite liquor solids and calcium chloride in relatively large concentrations have been known to contribute to the cohesiveness of cement mixes to some degree, the other two components, individually, have not been known to impart any such improvement. Nevertheless, the combination of the four components, with lower than normal concentrations of each, imparts a degree of cohesiveness to cement mixes that far exceeds anything producible with any of the individual components or any prior known combinations of them in any concentration. The resistance to segregation of lean mixes with very high water contents, when the four-component combination is employed, is particularly pronounced and quite revolutionary in character.

The property of producing strengths with 5% to 6% of entrained air that are higher than strengths heretofore obtainable with much lower air contents is a completely anomalous characteristic of the four-component combination. Experience, even with the use of prior art additives, has been that an increase in entrained air is accompanied by a generally corresponding reduction in final compressive strength.

The above-described properties of the four-component combinations of the present invention can only be attributed to some kind of synergistic effect in the combination for which the explanation is entirely obscure at the present time.

The amounts of the four components relative to each other which should be used in accordance with the invention have no clearly defined limits and may be varied over a considerable range while achieving the benefits of the invention to varying degrees. In meeting unusual or severe performance requirements such as, for example, abnormally slow or fast finishing times, the relative proportions of the four components may be varied over the following wide range.

|  | Parts |
|---|---|
| Waste sulfite liquor solids | 5 to 50 |
| Aromatic carboxylic compound | 1 to 15 |
| Chloride accelerator | ½ to 40 |
| Water-soluble amine | ½ to 10 |

Mixtures of the four components within the above ranges may be incorporated in hydraulic cement mixes in amounts from about 1/10 to ¾ pound of the mixture per sack of cement, or from about 0.1% to about 0.75% by weight of the cement.

For the great majority of applications, the relative proportions of the four components should be within the following range of proportions:

|  | Parts |
|---|---|
| Waste sulfite liquor solids | 10 to 20 |
| Aromatic carboxylic compound | 2 to 6 |
| Chloride accelerator | 1 to 12 |
| Water-soluble amine | 1 to 5 |

Also, for the great majority of applications, the mixtures of the four components should be incorporated in hydraulic cement mixes in amounts from about ¼ to ¾ pound of the mixture per sack of cement, or from about 0.25% to 0.75% by weight of the cement.

The character and degree of improvements achieved by the present invention and the amounts and proportions of the four additive components which are preferably employed will be more fully explained hereinafter in connection with the description of various tests and illustrative examples of preferred additive compositions.

To illustrate the effects of the four-component additives of the invention on the compressive strengths of concrete mixes at 1, 7, and 28 days, the following Examples 1 to 4 are given in which the proportions of the four components of the additives were varied. Each example compares a plain mix of cement, sand, and coarse aggregate with the same mix containing the additive, both being mixed at the same time from the same basic ingredients with sufficient water to give substantially the same slump (as closely as it is practical to predict the slump from the consistency during mixing). The composition of the additive in terms of percent by weight of the cement in the final mix, the slump in inches (to nearest half-inch), the cement factor in sacks per yard, the amount of water in gallons per yard, the amount of air entrained in the mix in percent by volume, and the average compressive strengths in pounds per square inch of a number of test cylinders at each age tested are given in each example in tabular form. Because of the possibility of uncontrollable differences in temperature and humidity, and because of minor variations in lots of cement, sand, and aggregates used in the examples run at different times, it is to be noted that the data for any one example may be only roughly comparable with the data for any of the other examples.

The waste sulfite liquor solids used in all of the examples herein were the dried residue from neutralized waste sulfite liquor from which fermentable sugars had been removed.

*Example 1*

|  | Plain Mix | Plus Additive |
|---|---|---|
| Total Additive | None | .25 |
|    Waste sulfite liquor solids |  | .10 |
|    Sodium salicylate |  | .06 |
|    Calcium chloride |  | .07 |
|    Triethanolamine |  | .02 |
| Slump | 3.5 | 3.0 |
| Cement factor | 5.01 | 5.01 |
| Water content | 32.4 | 29.6 |
| Air content | 2.1 | 3.5 |
| 1-day strength | 510 | 740 |
| 7-day strength | 2,730 | 4,270 |
| 28-day strength | 4,630 | 5,710 |

Example 2

|  | Plain Mix | Plus Additive |
|---|---|---|
| Total additive | None | .35 |
| Waste sulfite liquor solids |  | .20 |
| Sodium salicylate |  | .06 |
| Calcium chloride |  | .07 |
| Triethanolamine |  | .02 |
| Slump | 3.0 | 3.5 |
| Cement factor | 4.99 | 5.02 |
| Water content | 33.8 | 30.1 |
| Air content | 2.0 | 4.5 |
| 1-day strength | 440 | 670 |
| 7-day strength | 2,950 | 4,030 |
| 28-day strength | 4,370 | 5,340 |

Example 3

|  | Plain Mix | Plus Additive |
|---|---|---|
| Total additive | None | .38 |
| Waste sulfite liquor solids |  | .20 |
| Sodium salicylate |  | .06 |
| Calcium chloride |  | .10 |
| Triethanolamine |  | .02 |
| Slump | 5.0 | 5.0 |
| Cement factor | 4.99 | 5.02 |
| Water content | 33.6 | 27.8 |
| Air content | 2.0 | 4.4 |
| 1-day strength | 450 | 900 |
| 7-day strength | 2,830 | 4,580 |
| 28-day strength | 4,520 | 6,000 |

Example 4

|  | Plain Mix | Plus Additive |
|---|---|---|
| Total additive | None | .60 |
| Waste sulfite liquor solids |  | .25 |
| Sodium salicylate |  | .06 |
| Calcium chloride |  | .25 |
| Triethanolamine |  | .04 |
| Slump | 4.0 | 4.0 |
| Cement factor | 5.01 | 4.98 |
| Water content | 32.9 | 27.0 |
| Air content | 1.9 | 5.4 |
| 1-day strength | 450 | 750 |
| 7-day strength | 2,700 | 4,890 |
| 28-day strength | 4,660 | 6,000 |

The following Example 5 was carried out in the same manner as the preceding examples, and the same data are tabulated, but the two mixes were made with different cement factors to show the strengths obtained by use of the four-component additive and 20% less cement.

Example 5

|  | Plain Mix | Plus Additive |
|---|---|---|
| Total additive | None | .25 |
| Waste sulfite liquor solids |  | .08 |
| Sodium salicylate |  | .06 |
| Calcium chloride |  | .09 |
| Triethanolamine |  | .02 |
| Slump | 3.0 | 3.5 |
| Cement factor | 5.54 | 4.39 |
| Water content | 33.8 | 27.4 |
| Air content | 2.0 | 5.7 |
| 1-day strength | 540 | 660 |
| 7-day strength | 2,950 | 3,770 |
| 28-day strength | 4,560 | 5,020 |

The following Examples 6, 7, 8, and 9 were run over a period of a few days and were intended for direct comparison to show the effects of using increasing amounts of the aromatic carboxylic compound and the water-soluble amine, while leaving the amounts of waste sulfite liquor solids and calcium chloride constant. The constant amount of waste sulfite liquor solids was in the range commonly used in the art without the other two components, but the constant amount of calcium chloride was substantially less than that previously considered necessary to effectively counteract the set-retarding that is characteristic of waste sulfite liquor solids. (Cf. Scripture U. S. Patent 2,081,642.) Because tests on different days may be only roughly comparable, each test included a simultaneous run with a comparable plain mix as a control, and each test is again given in a separate example, along with the run on the corresponding plain mix control.

Example 6

|  | Plain Mix | Plus Additive |
|---|---|---|
| Total additive | None | .27 |
| Waste sulfite liquor solids |  | .20 |
| Sodium salicylate |  | .01 |
| Calcium chloride |  | .05 |
| Triethanolamine |  | .01 |
| Slump | 4.5 | 5.5 |
| Cement factor | 5.01 | 5.04 |
| Water content | 32.6 | 27.4 |
| Air content | 2.0 | 4.2 |
| 1-day strength | 520 | 820 |
| 7-day strength | 3,040 | 4,660 |
| 28-day strength | 4,900 | 6,200 |

Example 7

|  | Plain Mix | Plus Additive |
|---|---|---|
| Total additive | None | .33 |
| Waste sulfite liquor solids |  | .20 |
| Sodium salicylate |  | .05 |
| Calcium chloride |  | .05 |
| Triethanolamine |  | .03 |
| Slump | 4.5 | 5.5 |
| Cement factor | 5.03 | 5.05 |
| Water content | 32.1 | 25.9 |
| Air content | 2.0 | 4.6 |
| 1-day strength | 550 | 940 |
| 7-day strength | 2,880 | 5,140 |
| 28-day strength | 4,580 | 6,670 |

Example 8

|  | Plain Mix | Plus Additive |
|---|---|---|
| Total additive | None | .31 |
| Waste sulfite liquor solids |  | .20 |
| Sodium salicylate |  | .01 |
| Calcium chloride |  | .05 |
| Triethanolamine |  | .05 |
| Slump | 3.5 | 3.5 |
| Cement factor | 5.05 | 5.05 |
| Water content | 31.6 | 25.6 |
| Air content | 2.0 | 4.8 |
| 1-day strength | 510 | 1,030 |
| 7-day strength | 3,020 | 5,210 |
| 28-day strength | 4,680 | 6,480 |

Example 9

|  | Plain Mix | Plus Additive |
|---|---|---|
| Total additive | None | .39 |
| Waste sulfite liquor solids |  | .20 |
| Sodium salicylate |  | .05 |
| Calcium chloride |  | .05 |
| Triethanolamine |  | .09 |
| Slump | 4.5 | 4.0 |
| Cement factor | 5.07 | 5.08 |
| Water content | 31.0 | 24.4 |
| Air content | 1.9 | 5.0 |
| 1-day strength | 550 | 840 |
| 7-day strength | 3,100 | 4,920 |
| 28-day strength | 5,010 | 6,200 |

To illustrate the very rapid gain in strength that can be achieved with the four-component additive of the invention in unusual situations where this is required, the effect of adding increasing amounts of calcium chloride while keeping the amounts of the other components constant is shown in the following Example 10.

Example 10

|  | Additive | | |
| --- | --- | --- | --- |
|  | A | B | C |
| Total additive | .38 | .78 | 2.78 |
| Waste sulfite liquor solids | .20 | .20 | .20 |
| Sodium salicylate | .06 | .06 | .06 |
| Calcium chloride | .10 | .50 | 2.50 |
| Triethanolamine | .02 | 0.2 | .02 |
| Slump | 5.5 | 5.0 | 5.0 |
| Cement factor | 4.98 | 5.00 | 4.97 |
| Water content | 27.5 | 27.3 | 27.4 |
| Air content | 5.0 | 5.0 | 5.2 |
| 1-day strength | 770 | 990 | 1,750 |
| 7-day strength | 4,400 | 4,840 | 5,230 |
| 28-day strength | 6,060 | 6,140 | 6,370 |

As will be apparent from Example 10, the amount of chloride accelerator can be raised to a very high figure relative to the amounts of the other three components of the additive admixture to obtain rapid gain in early strength with little effect upon final strength and little effect upon consistency, as indicated by the slump and water content figures, and little effect upon the amount of entrained air. Though not shown in the data given in Example 10, it should also be explained that such wide variations in chloride accelerator also have little effect upon the excellent workability and cohesiveness obtained with the four-component additives, though high concentrations of chloride accelerator do tend to accelerate the hardening during the normal finishing period so much as to be objectionable except where surface finishing is not required, as in the case of structures having forms covering all surfaces ultimately to be exposed.

With regard to finishing time for cement mixes, there is no standard laboratory measuring technique in the art. Efforts to present actual data on the time required for a mix to set to a finishing condition and the additional time available in which to perform finishing operations become so involved and are so dependent upon judgment as to be quite unsatisfactory. Accordingly, conclusions are normally drawn from experience with a large number of uses in the field under a wide range of actual working conditions.

From experience in extensive experimental use of the four-component additives of the present invention in the field, under a wide variety of atmospheric conditions and concreting material, together with special rate-of-hardening tests described below, it has become apparent that these additives have highly beneficial effects in alleviating the common finishing problems. Over a wide range of proportions of the four components of the invention, when operating at normal and high temperatures, the hardening rate more closely approaches that of a plain mix than in the case of prior commercial water-reducers, permitting earlier finishing and a longer period during which finishing can be completed for a given degree of water and cement reduction, or strength increase, provided by the various water-reducers.

At low temperatures, where the setting of plain cement mixes to a finishing condition is greatly retarded, known prior water-reducers cause still greater delay and often cannot be used conveniently for that reason. The four-component additives of the present invention, however, actually accelerate the set to a finishing condition in cold weather, compared to a plain mix. The invention thus makes the benefits of water-reducers available on many cold weather jobs where they could not previously be obtained because of the surface finishing problem.

As explained in the introductory portion of this specification, preceding the foregoing examples, the action of the four-component additives of this invention in reducing finishing delays is unpredictable from anything heretofore known about the action of the four components when used individually, or in any prior combinations. As also mentioned in that connection, sodium salicylate has been used alone as an additive heretofore with no recognized significant effect on early rate of hardening or rate of gain in strength. However, it has been established, by a rate of hardening test recently developed and subsequently described, which measures the rate of development of bond strength of cement mixes, that the aromatic carboxylic compounds in small amounts function as an accelerator in the early stages of setting, though they do not appreciably affect strength at 1 day. Surprisingly, when used in the four-component additives of this invention, the various aromatic carboxylic compounds have a retarding effect, particularly during the period when the mix is in a surface finishing condition.

This last conclusion is based on tests made according to a newly developed method for measuring the early rate of hardening of cement mixes, which method is presently under consideration as a standard test method by the American Society for Testing Materials.

Briefly, the test method consists of embedding several ⅜-inch stainless steel pins to a five-inch depth in a rectangular specimen made from the cement mix to be tested, pulling the pins out at regular intervals during the early period of hardening of the mix, and measuring the force required to remove each pin. The force required to remove a given pin, divided by the surface area of the pin in contact with the cement mix, is the bond strength developed by the mix at that particular time. By means of this test method, the rate of hardening of the four-component additive can be compared directly with plain mixes under the same temperature conditions.

A correlation has been observed between the period during which finishing can be accomplished and the bond strength as measured above, and the tests made have all supported the above conclusion that the aromatic carboxylic compound of the four-component additives is responsible for the advantageous rate of hardening obtained. Up to a few hours after placement, depending upon concentrations and temperature, the presence or absence of this component seems to have no significant measurable effect on the rate of hardening. Omission of this component, however, results in rapid hardening thereafter, while the mix is in a surface finishing condition, often leaving insufficient time for finishing a large job. In the preferred amounts, however, this component exerts its noted retarding effect during the finishing period, and this is accentuated as the amount of this component in the four-component additives is increased, as indicated by the new test method just described. Surprisingly, however, the same amounts of the same four-component additives substantially accelerate the rate of hardening at low temperatures compared to plain mixes. Since plain mixes are disadvantageously retarded at such temperatures, causing finishing and form-stripping delays, the present invention serves to counteract this disadvantage of plain mixes.

With regard to the workability or flowability of cement mixes containing the four-component additives of the invention, evidence has been derived from visual observation in the field, there being no satisfactory tests for measuring workability. The cumulative effect of the evidence derived in the field has indicated substantial improvement in the workability of the mixes containing these four-component additives compared to prior water-reducers. For example, where slumps of 3 to 4 inches were previously required to achieve satisfactory workability in certain types of jobs, substitution of the water-reducers of the invention for those previously used permitted the use of lower slumps of from 1 to 2 inches with substantially lower water contents, while still obtaining the same workability and placeability, as nearly as could be judged by observing the performance of the materials in actual field uses. In other cases, the improved workability has been beneficial in permitting use of less sand, as well as less water, without loss of workability or reduction in slump, and while actually improving the cohesiveness of the mixes as evidenced by resistance to segregation and excellent coating of the large aggregate with the mortar. This has been particularly true in wet, lean mixes.

With regard to the effect of air-entrainment, cement mixes containing the four-component additives of the invention have most surprising properties. As is the case with most water-reducers, and particularly those containing waste-sulfite liquor solids, the four-component additives of this invention exhibit substantial air-entraining characteristics. This characteristic of water-reducers has heretofore limited their usefulness in large amounts to obtain a greater plasticizing action because of loss of strength, attributed to excessive air-entrainment, as well as because of the pronounced retardation that resulted. In other cases, where moderate amounts of the prior art water-reducers were employed, special air-entraining agents were sometimes used to improve resistance of the hardened concrete to freezing and thawing and to the scaling effects of salt used for de-icing; but the amount of air purposely entrained for this purpose was often limited by the need for avoiding the loss of strength resulting from higher air contents. However, when using the additives of this invention, air contents up to as high as 8% cause no significant loss in strength, compared to plain mixes with 20% higher cement factors, thus making it practical to use relatively large amounts of the water-reducers to obtain maximum cement economy with superior workability and the benefits of high air-entrainment without any significant loss in strength. The above surprising results obtained in accordance with the invention are illustrated by the following additional example.

*Example 11*

Tests were made with:
A. A plain mix (no additives)
B. A mix containing a relatively large quantity of a four-component water-reducer of the invention, plus an "air-detraining agent" to limit the amount of air entrained by the water-reducer, and
C. The same mix as mix B, but without the air-detraining agent, so as to cause high air-entrainment.

The resulting air contents (percent by volume) and the compressive strengths at 1, 7, and 28 days (lbs./sq. in.) are given in the following Tables I and II in which the results of two such sets of comparative tests are given. As in the previous examples, additive ingredients are given in terms of percent by weight of the cement, slump in inches, cement factor in sacks per yard, and water content in gallons per yard. The air-detraining agent in mix B in each set of tests was tributyl phosphate, the use of which for this purpose is the subject of copending application Serial No. 379,094 of Edward W. Scripture, Jr., filed September 8, 1953, now U. S. Patent No. Patent 2,776,903, issued January 8, 1957.

TABLE I

|  | Plain Mix A | Mix B | Mix C |
| --- | --- | --- | --- |
| Total Additive | None | .75 | .75 |
| Waste sulfite liquor solids |  | .39 | .39 |
| Sodium salicylate |  | .09 | .09 |
| Calcium chloride |  | .21 | .21 |
| Triethanolamine |  | .06 | .06 |
| Air-detraining agent |  | .0006 |  |
| Slump | 3.5 | 4.5 | 4 |
| Cement factor | 5.54 | 4.43 | 4.38 |
| Water content | 32.0 | 25.6 | 23.7 |
| Air content | 2.2 | 5.6 | 7.5 |
| 1-day strength | 600 | 480 | 540 |
| 7-day strength | 3,420 | 4,250 | 4,130 |
| 28-day strength | 5,470 | 5,570 | 5,430 |

TABLE II

|  | Plain Mix A | Mix B | Mix C |
| --- | --- | --- | --- |
| Total Additive | None | .75 | .75 |
| Waste sulfite liquor solids |  | .39 | .39 |
| Sodium salicylate |  | .09 | .09 |
| Calcium chloride |  | .21 | .21 |
| Triethanolamine |  | .06 | .06 |
| Air-detraining agent |  | .0007 |  |
| Slump | 4 | 4 | 3.5 |
| Cement factor | 5.54 | 4.43 | 4.34 |
| Water content | 32.0 | 25.1 | 23.8 |
| Air content | 2.2 | 6.0 | 8.0 |
| 1-day strength | 580 | 430 | 460 |
| 7-day strength | 3,410 | 4,330 | 4,240 |
| 28-day strength | 5,360 | 5,660 | 5,460 |

From the data in Tables I and II above, it will be observed that with as much as 7.5% and 8% entrained air, the strengths at 7 and 28 days obtained with mix C containing a four-component additive of the invention were little different from those obtained with the same mix B containing only 5.6% and 6.0% air and were substantially equal to or greater than the strengths obtained with plain mix A containing about 25% more cement.

Thus, the additives of the present invention may be used in normal quantities in combination with air entraining agents to provide higher air contents where desired without the loss of strengths heretofore experienced in the art. Also, the additives of the present invention, though they entrain appreciable air themselves, may be used in mixes made with air entraining cements without the loss in strengths that would normally be expected.

While the foregoing description of the invention and its various advantages refer largely to the use of a particular combination of four additive components in mixes of cement, aggregate and water, it is to be understood that still other additives may be included in cement mixes prepared in accordance with the invention for the purposes for which they are normally employed. Such other additives, for example, may be air-entraining agents, air-detraining agents (Example 11), pozzuolanic materials, fly ash, coloring materials, water-repellents, and the like.

The four-component additives of the invention may be added alone or mixed and added with such other additives, either to the cement, to the aggregate, or to the water, or they may be incorporated in the composite cement mix, alone or simultaneously with other additives, or in any other desired manner.

The presently preferred manner of using the invention is to mix the liquid amine component with the dry chloride accelerator in powder form, then mix in the waste sulfite liquor solids and the aromatic carboxylic compound as dry powders to form the four-component additives as a dry powder. This dry additive, with or without any other additives, may then be incorporated in the cement mix in any of the ways mentioned above which may be most convenient. However, the four components of the additives of the invention may, if desired, be incorporated separately into a cement mix, liquid components being most advantageously incorporated in the gage water before it is added to the dry components of the mix.

In view of the above, it is to be understood that the expression "consisting essentially of" as used in the appended claims in defining the combination of additives on which this invention is based, or in defining a cement mix containing the four components of the combination, does not preclude the presence of other additives for producing their known individual effects, which may be different from and independent of the effects resulting from use of the invention, or may be similar and additive in character, or may in some measure detract from the benefits of the invention. Also, both in the foregoing disclosure of the invention and in the appended claims, if the context is not expressly to the contrary, it is to be understood that all quantities of materials are intended to be expressed in terms of percent by weight based on the weight of hydraulic cement.

While the invention has been described and illustrated herein by reference to various specific materials, procedures, and examples, it is to be understood that the invention is not restricted to the particular materials, combinations of materials, and procedures selected for that purpose. Numerous variations of such details can be employed, as will be appreciated by those skilled in the art.

Having described our invention, we claim:

1. An additive for hydraulic cement mixes consisting essentially of from 5 to 50 parts by weight of waste sulfite liquor solids, from 1 to 15 parts by weight of a member of the class consisting of water-soluble aromatic carboxylic acids and their water-soluble salts and esters, from ½ to 40 parts by weight of a water-soluble chloride accelerator, and from ½ to 10 parts by weight of a water-soluble non-carboxylic amine selected from the group consisting of primary, secondary, and tertiary alkyl and alkylol amines.

2. A dry, powdery additive for modifying the strength, cohesiveness, workability, and setting properties of hydraulic cement mixes consisting essentially of from 5 to 50 parts by weight of dry waste sulfite liquor solids, from 1 to 15 parts by weight of a member of the class consisting of water-soluble aromatic carboxylic acids and their water-soluble salts and esters, from ½ to 40 parts by weight of a water-soluble chloride accelerator, and from ½ to 10 parts by weight of a water-soluble non-carboxylic amine selected from the group consisting of primary, secondary, and tertiary alkyl and alkylol amines.

3. An additive for hydraulic cement mixes consisting essentially of from 5 to 50 parts by weight of the dried residue from neutralized waste sulfite liquor from which a substantial part of the carbohydrates has been removed, from 1 to 15 parts by weight of a member of the class consisting of water-soluble aromatic carboxylic acids and their water-soluble salts and esters, from ½ to 40 parts by weight of a water-soluble chloride accelerator, and from ½ to 10 parts by weight of a water-soluble non-carboxylic amine selected from the group consisting of primary, secondary, and tertiary alkyl and alkylol amines.

4. An additive for hydraulic cement mixes consisting essentially of from 5 to 50 parts by weight of waste sulfite liquor solids, from 1 to 15 parts by weight of a member of the class consisting of salicylic acid and its water-soluble salts and esters, from ½ to 40 parts by weight of a water-soluble chloride accelerator, and from ½ to 10 parts by weight of a water-soluble non-carboxylic amine selected from the the group consisting of primary, secondary, and tertiary alkyl and alkylol amines.

5. An additive for hydraulic cemnt mixes consisting essentially of from 5 to 50 parts of waste sulfite liquor solids, from 1 to 15 parts by weight of a member of the class consisting of water-soluble aromatic carboxylic acids and their water-soluble salts and esters, from ½ to 40 parts by weight of a water-soluble chloride accelerator, and from ½ to 10 parts by weight of triethanolamine.

6. An additive for hydraulic cement mixes consisting essentially of from 5 to 50 parts by weight of waste sulfite liquor solids, from 1 to 15 parts by weight of a member of the class consisting of salicylic acid and its water-soluble salts and esters, from ½ to 40 parts by weight of a water-soluble chloride accelerator, and from ½ to 10 parts by weight of triethanolamine.

7. An additive for hydraulic cement mixes consisting essentially of from 10 to 20 parts by weight of waste sulfite liquor solids, from 2 to 6 parts by weight of a member of the class consisting of water-soluble aromatic carboxylic acids and their water-soluble salts and esters, from 1 to 12 parts by weight of a water-soluble chloride accelerator, and from 1 to 5 parts by weight of a water-soluble non-carboxylic amine selected from the group consisting of primary, secondary, and tertiary alkyl and alkylol amines.

8. A dry, powdery additive for modifying the strength, cohesiveness, working properties, and setting properties of hydraulic cement mixes consisting essentially of from 10 to 20 parts by weight of waste sulfite liquor solids, from 2 to 6 parts by weight of a member of the class consisting of water-soluble aromatic carboxylic acids and their water-soluble salts and esters, from 1 to 12 parts by weight of a water-soluble chloride accelerator, and from 1 to 5 parts by weight of a water-soluble non-carboxylic amine selected from the group consisting of primary, secondary, and tertiary alkyl and alkylol amines.

9. A hydraulic cement mix consisting essentially of a hydraulic cement, aggregate, sufficient water to effect hydraulic setting of the cement and produce a workably plastic mix, and from about 0.1% to about 0.75% by weight of the cement of a combination of additives for modifying the properties of the mix, said combination consisting essentially of from 5 to 50 parts by weight of waste sulfite liquor solids, from 1 to 15 parts by weight of a member of the class consisting of water-soluble aromatic carboxylic acids and their water-soluble salts and esters, from ½ to 40 parts by weight of a water-soluble chloride accelerator, and from ½ to 10 parts by weight of a water-soluble non-carboxylic amine selected from the group consisting of primary, secondary, and tertiary alkyl and alkylol amines.

10. A hydraulic cement mix consisting essentially of a hydraulic cement, aggregate, sufficient water to effect hydraulic setting of the cement and produce a workably plastic mix, and from about 0.25% to 0.75% by weight of the cement of a combination of additives for modifying the properties of the mix, said combination consisting essentially of from 10 to 20 parts by weight of waste sulfite liquor solids, from 2 to 6 parts by weight of a member of the class consisting of water-soluble aromatic carboxylic acids and their water-soluble salts and esters, from 1 to 12 parts by weight of a water-soluble chloride accelerator, and from 1 to 5 parts by weight of a water-soluble non-carboxylic amine selected from the group consisting of primary, secondary, and tertiary alkyl and alkylol amines.

11. A hydraulic cement mix according to claim 10 in which said waste sulfite liquor solids are the dried residue from neutralized waste sulfite liquor from which a substantial part of the carbohydrates has been removed.

12. A hydraulic cement mix according to claim 10 in which said aromatic carboxylic acid compound is a member of the class consisting of salicylic acid and its water-soluble salts and esters.

13. A hydraulic cement mix according to claim 10 in which said amine is triethanolamine.

14. A hydraulic cement mix according to claim 10 in which said chloride accelerator is a water-soluble metal chloride.

15. A hydraulic cement mix according to claim 10 in which said aromatic carboxylic acid compound is a member of the class consisting of salicylic acid and its water-soluble salts and esters, and said amine is triethanolamine.

16. A hydraulic cement mix according to claim 10 in which said waste sulfite liquor solids are the dried residue from neutralized waste sulfite liquor from which a substantial part of the carbohydrates has been removed, said aromatic carboxylic acid compound is a member of the class consisting of salicylic acid and its water-soluble salts and esters, said chloride accelerator is calcium chloride, and said amine is triethanolamine.

References Cited in the file of this patent

UNITED STATES PATENTS

| | | | |
|---|---|---|---|
| 1,772,999 | Huber | Aug. 12, | 1930 |
| 2,031,621 | Tucker | Feb. 25, | 1936 |
| 2,081,642 | Scripture | May 25, | 1937 |
| 2,360,517 | Scripture | Oct. 17, | 1944 |
| 2,360,519 | Scripture | Oct. 19, | 1944 |
| 2,435,594 | MacPherson | Feb. 10, | 1948 |
| 2,437,842 | Uhler | Mar. 16, | 1948 |

UNITED STATES PATENT OFFICE
CERTIFICATE OF CORRECTION

Patent No. 2,860,060                                              November 11, 1958

Stephen W. Benedict et al.

It is hereby certified that error appears in the printed specification of the above numbered patent requiring correction and that the said Letters Patent should read as corrected below.

Column 13, line 57, for "cemnt" read -- cement --; line 58, after "parts" insert -- by weight --.

Signed and sealed this 3rd day of February 1959.

(SEAL)
Attest:

KARL H. AXLINE
Attesting Officer

ROBERT C. WATSON
Commissioner of Patents